(12) United States Patent
Krier et al.

(10) Patent No.: US 8,079,392 B2
(45) Date of Patent: Dec. 20, 2011

(54) ALTERNATING STRAIGHT/WAVY REINFORCEMENT STRUCTURE FOR PNEUMATIC TIRE

(75) Inventors: Roland Willibrord Krier, Biwer (LU); Francois Pierre Charles Gerard Georges, Stavelot (BE); Jean-Michel Alphonse Fernand Gillard, Arlon (BE)

(73) Assignee: The Goodyear Tire & Rubber Company, Akron, OH (US)

( * ) Notice: Subject to any disclaimer, the term of this patent is extended or adjusted under 35 U.S.C. 154(b) by 589 days.

(21) Appl. No.: 12/339,527

(22) Filed: Dec. 19, 2008

(65) Prior Publication Data

US 2010/0154956 A1 Jun. 24, 2010

(51) Int. Cl.
*B60C 9/00* (2006.01)
*B60C 9/18* (2006.01)

(52) U.S. Cl. ........ 152/451; 152/531; 152/533; 152/556; 152/558; 428/221

(58) Field of Classification Search .................. 152/451, 152/531, 533, 556, 558; 428/221, 222
See application file for complete search history.

(56) References Cited

U.S. PATENT DOCUMENTS

| | | | | |
|---|---|---|---|---|
| 3,044,522 A | * | 7/1962 | Drakeford et al. ............ | 152/541 |
| 3,581,793 A | * | 6/1971 | Wittneben ..................... | 152/551 |
| 4,219,601 A | * | 8/1980 | Inoue et al. ................... | 428/222 |
| 4,838,966 A | * | 6/1989 | Oswald .......................... | 156/117 |
| 4,947,915 A | | 8/1990 | Panikkar et al. .............. | 152/531 |
| 5,176,769 A | | 1/1993 | Kadota et al. ................. | 152/523 |
| 5,225,013 A | | 7/1993 | Ohsawa et al. ............... | 152/527 |
| 5,383,507 A | * | 1/1995 | Sato et al. ..................... | 152/527 |
| 5,465,773 A | | 11/1995 | Kadota et al. ................. | 152/454 |
| 5,535,801 A | | 7/1996 | Iseki et al. ..................... | 152/528 |
| 5,685,928 A | * | 11/1997 | Toyoda ......................... | 152/533 |
| 6,058,997 A | | 5/2000 | Nishida et al. ............... | 152/529 |
| 6,116,311 A | | 9/2000 | Ueyoko et al. ............... | 152/531 |
| 6,125,900 A | | 10/2000 | De Plaisance et al. ....... | 152/531 |
| 6,352,093 B1 | | 3/2002 | Losey ........................... | 152/528 |
| 7,216,684 B2 | | 5/2007 | Villanueva et al. ........... | 152/531 |
| 2005/0194081 A1 | | 9/2005 | Yano et al. .................... | 152/527 |
| 2006/0237114 A1 | | 10/2006 | Takanami ..................... | 152/533 |
| 2007/0137748 A1 | | 6/2007 | Ital ................................ | 152/209 |
| 2007/0221307 A1 | | 9/2007 | Yano et al. .................... | 152/527 |
| 2007/0221308 A1 | | 9/2007 | Yano et al. .................... | 152/527 |

FOREIGN PATENT DOCUMENTS

| | | |
|---|---|---|
| EP | 0540303 | 5/1993 |
| EP | 0875402 | 3/2001 |
| WO | WO 88-03481 | 5/1988 |

OTHER PUBLICATIONS

U.S. Appl. No. 12/339,546, filed Dec. 19, 2008, Krier, et al.
U.S. Appl. No. 12/339,567, filed Dec. 19, 2008, Nicolas, et al.
U.S. Appl. No. 12/339,585, filed Dec. 19, 2008, Georges, et al.
U.S. Appl. No. 12/339,605, filed Dec. 19, 2008, Georges, et al.

* cited by examiner

*Primary Examiner* — Steven D Maki
*Assistant Examiner* — Robert Dye
(74) *Attorney, Agent, or Firm* — Robert N. Lipcsik

(57) ABSTRACT

A pneumatic tire includes a pair of parallel annular bead portions, at least one carcass ply reinforcing structure wrapped around the beads, a tread disposed radially outward of the carcass ply, a belt reinforcing structure disposed radially outward of the carcass ply reinforcing structure and radially inward of the tread in a crown area of the tire, and a layer of cords having an alternating straight/curled construction for improving performance characteristics of the pneumatic tire.

14 Claims, 3 Drawing Sheets

US 8,079,392 B2

ALTERNATING STRAIGHT/WAVY REINFORCEMENT STRUCTURE FOR PNEUMATIC TIRE

FIELD OF THE INVENTION

The present invention relates to a pneumatic tire, and more particularly, to a reinforcement structure for a pneumatic tire.

BACKGROUND OF THE PRESENT INVENTION

Conventional wide base, low aspect ratio truck tires have replaced two small base tires, so-called dual mounted tires. These conventional tires have typically been used on trailers because of their high load bearing ability. These wide base tires have also been used in the steering position of trucks because of typically higher mileage capabilities.

Tires in a drive position may also bear part of a trailer load and must have an increased load capacity. Wide base, low aspect ratio drive tires are often exposed to harsh service conditions. Conventional constructions have shown crown area durability problems. Also, pressure distribution through the footprints of these conventional wide base, low aspect ratio constructions has lacked acceptable uniformity.

One conventional pneumatic tire has been used on heavy vehicles. Radially outwards of the belt layers is at least one layer of metallic cords parallel to one another and substantially parallel to a circumferential direction of the tire. The metallic cords have an ultimate elongation between 4 and 8% and are formed by a single helically wound cord.

One conventional passenger tire has a wound ribbon reinforced with cords helically in at least two layers on top of belt plies. The ribbon has a width comprised between 15 and 45 mm. The reinforcing cords are nylon and have a lateral density of about 30 ends per inch (EPI).

Another conventional pneumatic tire has a crown reinforcing structure for pneumatic tires including a helically wound ribbon reinforced with steel cords. The ribbon has a width comprised between 5 and 50 mm and is directly wound on the carcass ply.

Still another conventional pneumatic tire has a reinforcing layer of straight metallic cords parallel to one another and substantially parallel to a circumferential direction of the tire. Such tire purports to have diminished running noise.

Yet another conventional pneumatic tire has a reinforcing layer of wavy or zigzag metallic cords parallel to one another and substantially parallel to a circumferential direction of the tire. Such tire purports to improve cornering characteristics.

SUMMARY OF THE INVENTION

A pneumatic tire in accordance with the present invention includes a pair of parallel annular bead portions, at least one carcass ply reinforcing structure wrapped around the beads, a tread disposed radially outward of the carcass ply, a belt reinforcing structure disposed radially outward of the carcass ply reinforcing structure and radially inward of the tread in a crown area of the tire, and a layer of cords having an alternating straight/curled construction for improving performance characteristics of the pneumatic tire.

In one aspect of the present invention, the layer has four adjacent cords of identical configuration. Each cord has lengths of straight cord interspersed between lengths of curled cord. The length of curled cord has a first amplitude.

In another aspect of the present invention, the layer further alternates groups of four curled lengths and four straight lengths in a direction generally perpendicular to a direction of the cords.

In still another aspect of the present invention, the length of straight cord is equal to the length of curled cord.

In yet another aspect of the present invention, the cords have an overall wavy configuration having a second amplitude greater than the first amplitude.

In still another aspect of the present invention, the pneumatic tire further comprises an overlay radially disposed between the belt reinforcing structure and the tread. The overlay is constructed of the layer.

In yet another aspect of the present invention, the cords of the overlay extend parallel to an equatorial plane of the tire.

In still another aspect of the present invention, the belt reinforcing structure is constructed of the layer.

In yet another aspect of the present invention, the carcass ply reinforcing structure is constructed of the layer.

A layer in accordance with the present invention reinforces a pneumatic tire. The layer comprises cords having an alternating straight/curled construction for improving performance characteristics of the pneumatic tire.

In one aspect of the present invention, the layer further comprises groups of four adjacent cords of identical configuration. Each cord has lengths of straight cord interspersed between lengths of curled cord. The length of curled cord has a first amplitude.

In still another aspect of the present invention, the lengths of four curled lengths alternate with the four straight lengths in a direction generally perpendicular to a direction of the cords.

In yet another aspect of the present invention, the length of straight cord is equal to the length of curled cord.

In still another aspect of the present invention, the cords have an overall wavy configuration having a second amplitude greater than the first amplitude.

In yet another aspect of the present invention, the layer comprises an overlay of the pneumatic tire.

In still another aspect of the present invention, the layer comprises a belt reinforcing structure of the pneumatic tire.

In yet another aspect of the present invention, the layer comprises a carcass ply reinforcing structure of the pneumatic tire.

In still another aspect of the present invention, the cords are constructed of steel.

DEFINITIONS

As used herein and in the claims,

"Aspect ratio" refers to the ratio of the tire's section height to its section width;

"Axial" and "axially" refer to directions which are parallel to the axis of rotation of a tire;

"Radial" and "radially" refer to directions that are perpendicular to the axis of rotation of a tire;

"Bead" refers to that part of a tire comprising an annular tensile member, the bead core, wrapped by ply cords and shaped, with or without other reinforcement elements to fit a designed tire rim;

"Belt" or "belt ply" refers to an annular layer or ply of parallel cords, woven or unwoven, underlying the tread, not anchored to the bead, and having cord angles of from 0° to 80° with respect to the EP of the tire;

"Carcass" refers to the tire structure apart from the belt structure, tread, undertread, and sidewall rubber but including the beads, (carcass plies are wrapped around the beads);

"Circumferential" refers to lines or directions extending along the perimeter of the surface of the annular tread perpendicular to the axial direction;

"Cord" refers to one or more of the reinforcement elements, comprising one or more filaments/wires which may or may not be twisted or otherwise formed, which may further include strands which strands may also be formed, of which the plies in a product are comprised;

"Crown" refers to substantially the outer circumference of a tire where the tread is disposed;

"Equatorial plane (EP)" refers to a plane that is perpendicular to the axis of rotation of a tire and passes through the center of the tire's tread;

"Filament" refers to an individual metallic wire;

"Footprint" refers to the contact patch or area of contact of the tire tread with a flat surface at zero speed and under normal load and pressure or under specified load, pressure and speed conditions;

"High Tensile Steel (HT)" refers to a steel with a tensile strength of at least 3400 MPa@ 0.20 mm filament diameter;

"Lay length" refers to the axial distance required for a filament, strand or layer to make one 360-degree helical revolution in a strand or cord;

"Lang's Lay Cord" refers to a cord in which the direction of lay in the strands is the same as the direction of lay in closing the cord.

"Normal Tensile Strength (NT) Steel" refers to a steel with a tensile strength of at least 2800 MPa@ 0.20 mm filament diameter;

"Ply" refers to a continuous layer of rubber coated parallel cords;

"Section height" refers to the radial distance from the nominal rim diameter to the outer diameter of the tire at its equatorial plane;

"Section width" refers to the maximum linear distance parallel to the axis of the tire and between the exterior of its sidewalls when and after it has been inflated at normal inflation pressure for 24 hours, but unloaded, excluding elevations of the sidewalls due to labeling, decoration or protective bands;

"Spliced belt ply" refers to a ply that has the lateral sides extending across the whole lateral width of the belt, the circumferential ends being spliced and overlapping, forming a lap-splice or a butt-splice;

"Strand" refers to a group of filaments combined together to form a unit;

"Super single tire" refers to a tire which replaces dual mounted tires on a specific axle; they are low aspect ratio tires and have a section width exceeding the section width of one of the previously dual mounted tires but inferior to the dual assembly width;

"Super Tensile Steel (ST)" refers to a steel with a tensile strength of at least 3650 MPa@ 0.20 mm filament diameter;

"Tensile strength" is determined by ASTM A370-92 as applied to steel wire product;

"Tread width (TW)" refers to the arc length of the tread surface in the axial direction, that is, in a plane passing through the axis of rotation of the tire; and "Twist" refers to the number of turns about its axis per unit of length in a filament, strand or cord.

"Twist direction" refers to the slope of the helix of a filament, strand or layer when the cord is held vertically and may be left or right. If the slope of the spirals conforms in direction to the slope of the center portion of the letter "S", then the twist is called "S" or "left-hand". If the slope of the spirals conforms to the slope of the center portion of the letter "Z", then the twist is called "Z" or "right-hand".

BRIEF DESCRIPTION OF THE DRAWINGS

The accompanying drawings, which are incorporated in and constitutes a part of this specification, illustrate embodiments of the invention and, together with a general description of the invention given above, and the detailed description given below, serve to explain the invention.

DETAILED DESCRIPTION OF THE INVENTION

Figure 1:
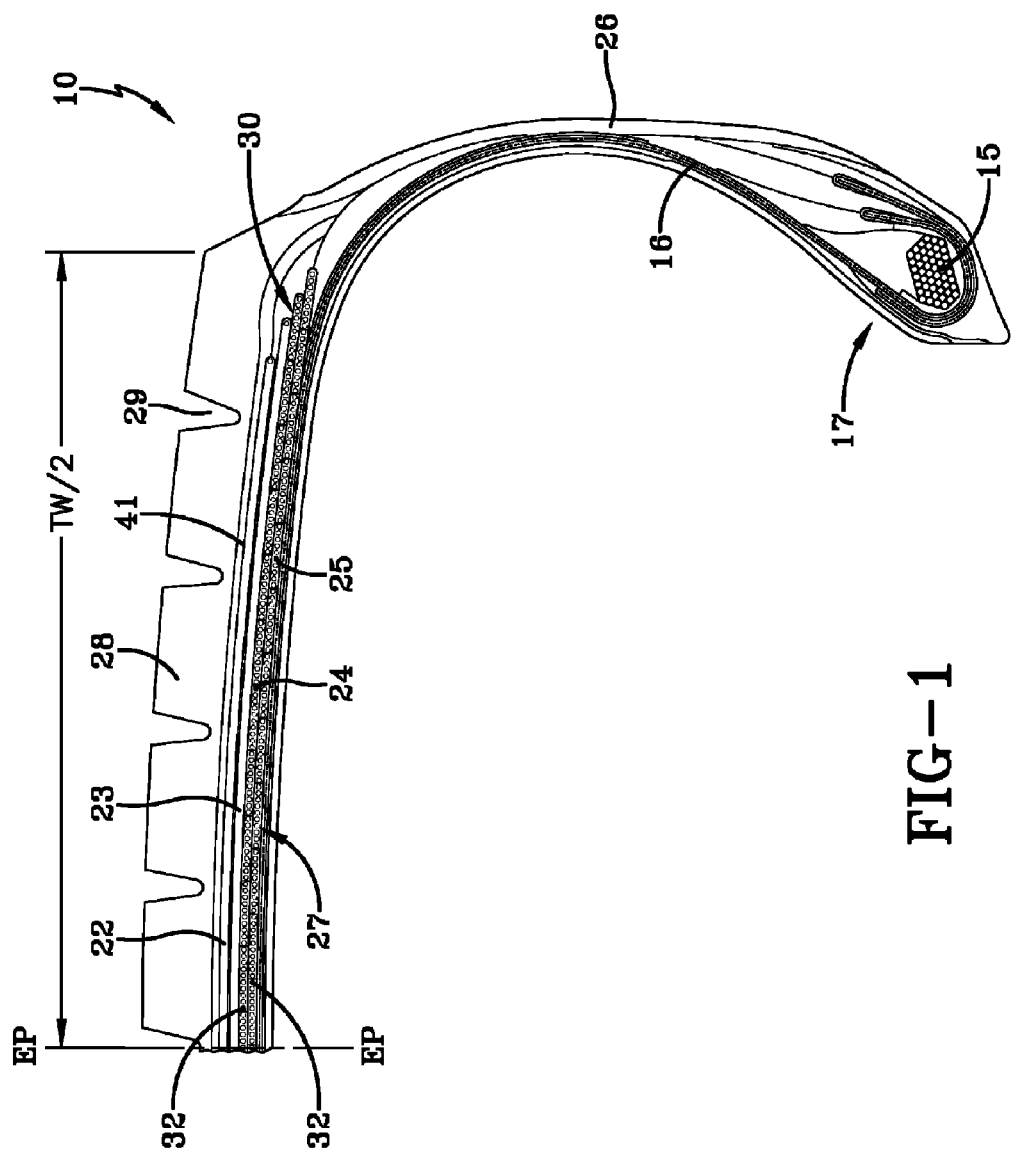
FIG. 1 is a schematic cross-sectional view of part of a tire for use with a reinforcing structure in accordance with the present invention, taken in a plane that contains the axis of rotation of the tire.

With reference to FIG. 1, an example pneumatic tire 10 for use with the present invention is partially illustrated. The example pneumatic tire 10 comprises a pair of substantially parallel annular bead cores 15 (one shown) located in bead portions 17 and a carcass ply reinforcing structure 16. The carcass ply reinforcing structure 16 may be wrapped over the bead cores 15 such that reinforcement cords make an angle with respect to the equatorial plane (EP) of the tire 10. The angle may be, for example, between 75° and 90°. Each bead portion 17 may comprise an apex and reinforcing structures such as chippers, flippers, and gum strips. A tread 28, radially outward of the carcass ply 16, may comprise grooves 29 disposed radially outward of a crown reinforcing belt structure 27 and sidewalls 26 arranged between the tread 28 and the bead portions 17. The carcass ply reinforcing structure 16 and belt structure 27 may be reinforced with substantially parallel longitudinal reinforcing members or cords.

The example belt reinforcing structure 27 may comprise belts plies 22, 23 reinforced with steel cords. The example radially outer belt ply 22 may be reinforced with steel cords making an angle between 10° and 60° with respect to the equatorial plane (EP). The example adjacent radially inner belt ply 23 may be reinforced with steel cords making an angle between −10° and −60° with respect to the equatorial plane (EP). Typically, the steel cords in these two radially belt plies 22, 23 may have the same inclination, but opposed angles, with respect to the equatorial plane (EP).

In the example pneumatic tire 10, the steel cords of the belt plies 22, 23 may have a construction such as 12×0.35+1× 0.15, though other suitable steel cord constructions commonly used for belt ply reinforcement nay also be acceptable. The steel grades may be high tensile. The lateral density of the steel cords may be between 8 and 15 ends per inch (EPI).

The example belt reinforcing structure 27 may include a further reinforcing structure 30 radially inward of the belt plies 22, 23. The example reinforcing structure 30 may comprise a spirally wound ribbon extending transversely as far as lateral edges of the belt plies 22, 23. The example ribbon 30 may be constructed from elastomeric materials reinforced by steel cords. The spiral convolutions of the ribbon may be disposed at an angle between 0° and 5° with respect to the equatorial plane (EP). The ribbon 30 may thus form a continuous annular ring having a substantially even cord distribution across the axial width of the reinforcing structure.

The example ribbon 30 may have a thickness of 2.5 mm and a width of 5-25 mm with a lateral cord distribution density of between 8 EPI and 16 EPI. The steel cords of the ribbon 30 may be constructed of high elongation steel (i.e., normal tensile steel). Such steel may allow an elongation up to 4%. The steel cord construction for the example ribbon 30 may be 3×7×0.22.

The spirally wound belt reinforcing structure 30 may further comprise a first annular layer 24 and a second annular layer 25 located radially adjacent to, and radially inward of, the first annular layer. The first annular layer 24 may have spiral convolutions opposite to the winding of the second annular layer 25 so that the cords of each layer cross at a small or negligible angle. With such a construction, the two layers 24, 25 may be wound continuously, in succession, without a break in the ribbon of the spirally wound belt reinforcing structure 30.

The lay length of the steel cords of the spirally wound belt reinforcing structure 30, which represents the axial distance required to complete a 360° revolution of any filament in the cord, may typically be less than 15 mm and adjusted to provide optimum elongation properties. The steel cords may be arranged to have a lateral density of less than 20 EPI measured at the equatorial plane (EP) of the example tire 10.

The first and second annular layers 25, 24 of the ribbon 30 may alternatively have a constant overlapping relationship with one another. The ribbon 30 may be applied in one single operation, or in two successive operations, one for each ribbon with the equal or unequal width.

The example tire 10 may further include an overlay reinforcing structure 41 disposed radially outward of the belt reinforcing structure 27 and radially inward of the tread 28. The overlay reinforcing structure 41 may add further load bearing strength to the example tire 10, as well as improved high speed performance and durability. This example overlay reinforcing structure 41 may be wound in a circumferentially offset manner so that the wavy portions L2 are not laterally aligned with each other.

Figure 2:
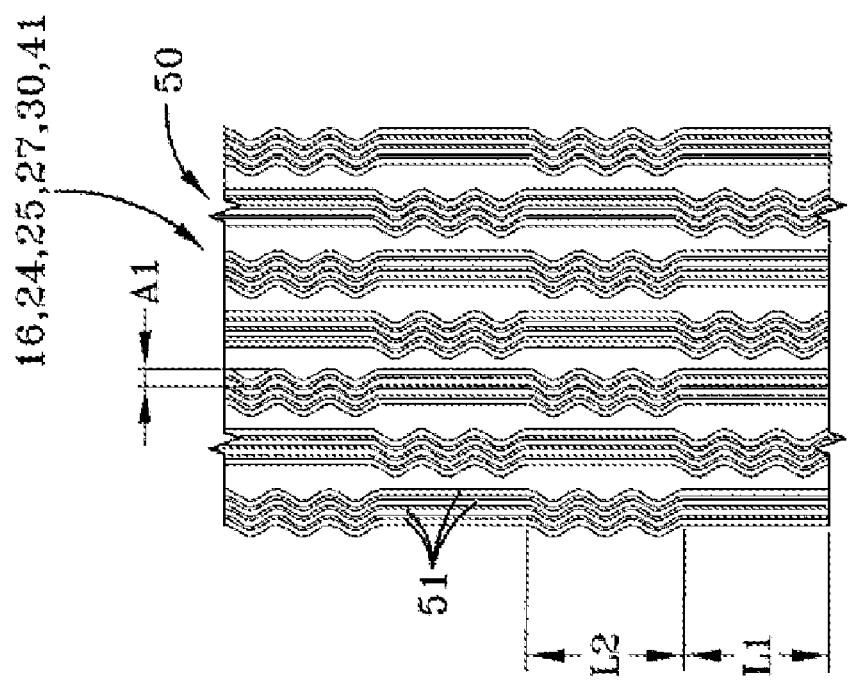
FIG. 2 illustrates a schematic plan view of a portion of a reinforcing structure in accordance with one aspect of the present invention.

In accordance with one aspect of the present invention, any combination of the above described example reinforcing structures 16, 27, 30, 41 may be comprised of a generally planar layer 50 of steel or aramid cords 51 having an alternating straight/curled construction and overall straight configuration (FIG. 2). The straight and curled portions may have a width in the range of 5 mm to 15 mm, or more specifically in the range of 12 mm to 14 mm. The cords may be constructed as single piece lengths and curled by any suitable method. The example construction of the layer 50 of FIG. 2 comprises four adjacent cords of identical construction, each having first lengths L1 of straight/linear cord interspersed by lengths L2 of curled or sinusoidal cords having a curl amplitude of A1. The specific example of the layer 50 of FIG. 2 further alternates groups of four curled and straight lengths in a direction generally perpendicular to the cords 51. Further, L1 and L2 are illustrated as equal in FIG. 2, but may be adjusted for various characteristics. Additionally, other numbers of cords, such as for example five, may be grouped as illustrated in FIG. 2.

Figure 3:
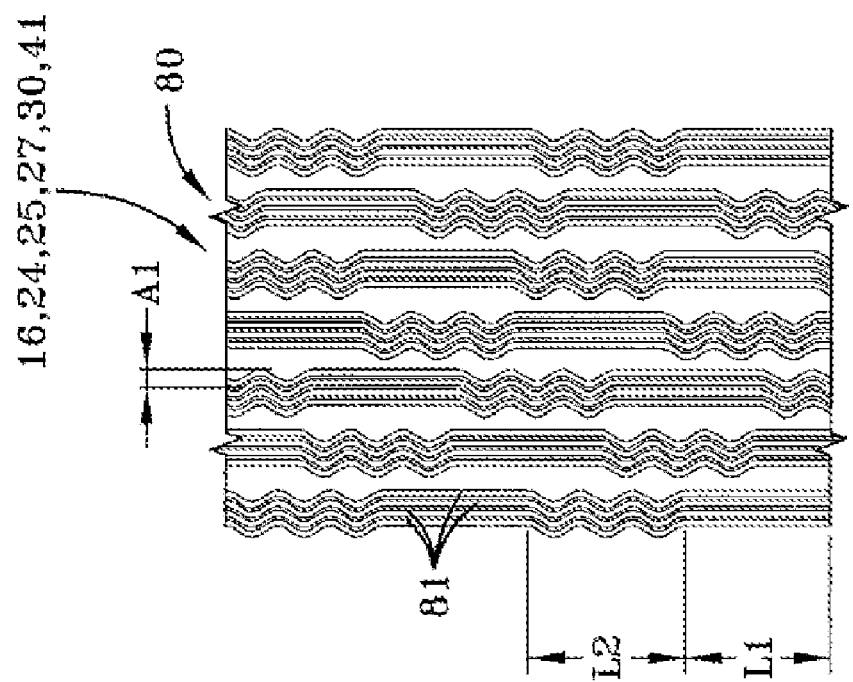
FIG. 3 illustrates a schematic plan view of a portion of a reinforcing structure in accordance with another aspect of the present invention.

In accordance with another aspect of the present invention, any combination of the above described example reinforcing structures 16, 27, 30, 41 may be comprised of a generally planar layer 80 of steel cords 81 having an alternating straight/curled construction and overall straight configuration (FIG. 3). The straight and curled portions may have a width in the range of 5 mm to 15 mm, or more specifically in the range of 12 mm to 14 mm. The cords may be constructed as single piece lengths and curled by any suitable method. The example construction of the layer 80 of FIG. 3 comprises four adjacent cords of identical construction, each having first lengths L1 of straight/linear cord interspersed by lengths L2 of curled or sinusoidal cords having a curl amplitude of A1. The specific example of the layer 80 of FIG. 3 further randomly alternates groups of four curled and straight lengths in a direction generally perpendicular to the cords 81. Further, L1 and L2 are illustrated as equal in FIG. 3, but may be adjusted for various characteristics. Additionally, other numbers of cords, such as for example five, may be grouped, in either a predetermined pattern or randomly.

Figure 4:
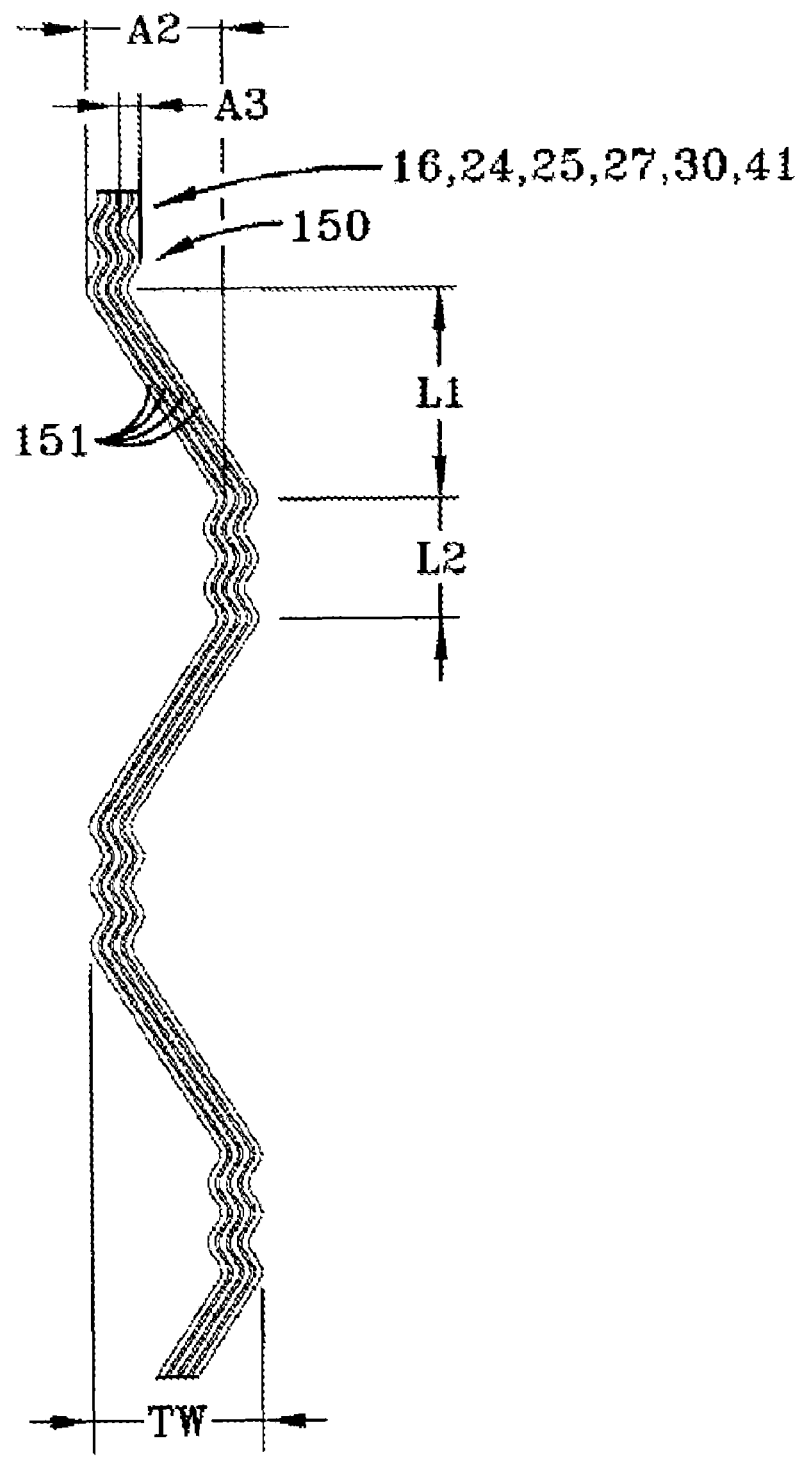
FIG. 4 illustrates a schematic plan view of a portion of a reinforcing structure in accordance with still another aspect of the present invention.

In accordance with still another aspect of the present invention, any combination of the above described example reinforcing structures 16, 27, 30, 41 may be comprised of a generally planar layer 150 of wavy steel cords 151 having an alternating straight/curled construction (FIG. 4). The straight and curled portions may have a width in the range of 5 mm to 15 mm, or more specifically in the range of 12 mm to 14 mm. The cords may be constructed as single piece lengths and curled and waved by any suitable method. The example construction of the layer 150 of FIG. 4 comprises four adjacent wavy cords 151 having an identical overall wavy configuration with wave amplitude A2, each having first angled lengths L1 of straight cord interspersed by lengths L2 of circumferentially extending curled or sinusoidal cords at the locations of changes of direction of the cords. The curled portions of the cords 151 may have a curl amplitude A3. The wave amplitude A2 is illustrated in FIG. 4 as greater than the curl amplitude A3. As in the example of FIGS. 2 and 3, the specific example of the layer 150 of FIG. 4 further groups four cords 151 extending in a direction generally perpendicular to the overall direction of the cords. Further, L1 and L2 are illustrated in FIG. 4, but may be adjusted for optimal characteristics. Further, the example groups of four cords 151 comprise straight lengths on the inclined portions of the overall wave and curled portions at the changes of direction of the overall wave.

When used in an overlay, such as an example spirally wound overlay 41, the straight lengths L1 and curled lengths of FIG. 2 or 3 may be disposed at a range of between −2.0° to 2.0°, or more specifically between −1.5° to 1.5°, relative to the equatorial plane EP of a tire 10. Such a construction may improve crown durability and heat generation/dissipation over conventional 0° straight cord overlay constructions. The construction may also minimize zipper breaks and wire compression issues by providing additional effective length to the cords 51 or 81. The construction further improves load transfer from the cords to the rubber matrix in which the cords are embedded.

When used in an overlay, such as an example spirally wound overlay 41, the overall wavy configuration of FIG. 4 may be disposed with straight portions L1 at a range of between −2.0° to 2.0°, or more specifically between −1.5° to 1.5°, relative to the equatorial plane EP of a tire 10 and extending across a tread width TW of the tire. Such a construction may further improve crown durability and heat generation/dissipation over conventional 0° straight cord overlay constructions. The construction may also further minimize zipper breaks and wire compression issues by providing additional effective length to the cords 151. The construction further improves load transfer from the cords to the rubber matrix in which the cords are embedded.

As shown in FIG. 4, cords 151 of the example overlay 41 in accordance with the present invention may thereby comprise a zigzag construction with straight portions L1 extending across the axial width of the tire 10 and wavy portions L2 disposed at the shoulders of the tire for facilitating changes of direction of the cords. As stated above, the wavy/change of direction portions L2 may be circumferentially offset so that the wavy/change of direction portions are distributed circumferentially throughout the shoulders of the tire.

While the invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. Thus, the invention in its broader aspects is therefore not limited to the specific details, representative apparatus and method, and illustrative examples shown and described. Accordingly, departures may be made from such details without departing from the spirit or scope of applicants' general inventive concept.

What is claimed is:

1. A layer for reinforcing a pneumatic tire comprising cords having an alternating straight/curled construction for improving performance characteristics of the pneumatic tire, the layer further comprising groups of four adjacent cords of identical configuration, each cord having lengths of straight cord interspersed between lengths of curled cord, the length of curled cord having a first amplitude, the lengths of four curled lengths alternating with the four straight lengths in a direction generally perpendicular to a direction of the cords.

2. The layer as set forth in claim 1 wherein the length of straight cord is equal to the length of curled cord.

3. The layer as set forth in claim 1 wherein the cords have an overall wavy configuration having a second amplitude greater than the first amplitude.

4. The layer as set forth in claim 1 wherein the layer comprises an overlay of the pneumatic tire.

5. The layer as set forth in claim 1 wherein the layer comprises a belt reinforcing structure of the pneumatic tire.

6. The layer as set forth in claim 1 wherein the layer comprises a carcass ply reinforcing structure of the pneumatic tire.

7. The layer as set forth in claim 1 wherein the cords are constructed of steel.

8. A pneumatic tire comprising:
a pair of parallel annular bead portions;
at least one carcass ply reinforcing structure wrapped around the beads;
a tread disposed radially outward of the carcass ply;
a belt reinforcing structure disposed radially outward of the carcass ply reinforcing structure and radially inward of the tread in a crown area of the tire; and
a layer of cords having an alternating straight/curled construction for improving performance characteristics of the pneumatic tire,
the layer having four adjacent cords of identical configuration, each cord having lengths of straight cord interspersed between lengths of curled cord, the length of curled cord having a first amplitude,
the layer further alternating groups of four curled lengths and four straight lengths in a direction generally perpendicular to a direction of the cords.

9. The pneumatic tire as set forth in claim 8 wherein the length of straight cord is equal to the length of curled cord.

10. The pneumatic tire as set forth in claim 8 wherein the cords have an overall wavy configuration having a second amplitude greater than the first amplitude.

11. The pneumatic tire as set forth in claim 8 further comprising an overlay radially disposed between the belt reinforcing structure and the tread, the overlay being constructed of the layer.

12. The pneumatic tire as set forth in claim 11 wherein the cords of the overlay extend parallel to an equatorial plane of the tire.

13. The pneumatic tire as set forth in claim 8 wherein the belt reinforcing structure is constructed of the layer.

14. The pneumatic tire as set forth in claim 8 wherein the carcass ply reinforcing structure is constructed of the layer.

* * * * *